(12) United States Patent
Delfino et al.

(10) Patent No.: US 6,994,135 B2
(45) Date of Patent: Feb. 7, 2006

(54) FLEXIBLE NON-PNEUMATIC TIRE

(75) Inventors: Antonio Delfino, La Suisse (CH);
Henry Hinc, La France (FR); Daniel Laurent, La Suisse (CH)

(73) Assignee: Conception et Developpement Michelin S.A., Givisiez (CH)

( * ) Notice: Subject to any disclaimer, the term of this patent is extended or adjusted under 35 U.S.C. 154(b) by 0 days.

(21) Appl. No.: 10/425,009

(22) Filed: Apr. 28, 2003

(65) Prior Publication Data

US 2003/0226630 A1   Dec. 11, 2003

(30) Foreign Application Priority Data

Apr. 29, 2002   (FR) .................................. 02 05474

(51) Int. Cl.
*B60C 7/08*   (2006.01)

(52) U.S. Cl. ...................... 152/276; 152/270; 152/277
(58) Field of Classification Search .................. 152/69, 152/74, 76, 80, 84, 87, 92, 270, 275, 276, 152/277, 284, 285, 286, 287
See application file for complete search history.

(56) References Cited

U.S. PATENT DOCUMENTS

| 1,346,695 | A | * | 7/1920 | Benedict et al. ............ 152/287 |
| 1,446,939 | A | * | 2/1923 | Sisti ............................. 152/74 |
| 1,450,473 | A |   | 4/1923 | Carson |
| 1,610,238 | A | * | 12/1926 | Benson ........................ 152/276 |
| 1,625,679 | A | * | 4/1927 | Pearson ...................... 152/277 |
| 1,647,455 | A | * | 11/1927 | Levinson .................... 152/277 |
| 1,651,211 | A | * | 11/1927 | Lambert ..................... 152/277 |
| 1,790,992 | A | * | 2/1931 | Matlock ..................... 152/276 |
| 1,822,556 | A | * | 9/1931 | Barber ........................ 152/284 |
| 2,346,799 | A | * | 4/1944 | Tripp .......................... 152/276 |
| 4,248,287 | A |   | 2/1981 | Christman ................. 152/354 |
| 4,307,767 | A |   | 12/1981 | Calori ........................ 152/353 |
| 5,236,027 | A | * | 8/1993 | Lu .............................. 152/250 |
| 6,374,887 | B1 | * | 4/2002 | Subotics ..................... 152/276 |
| 2002/0043319 | A1 |   | 4/2002 | Meraldi |

FOREIGN PATENT DOCUMENTS

WO   0037269   6/2000

* cited by examiner

*Primary Examiner*—Russell D. Stormer
(74) *Attorney, Agent, or Firm*—Cohen, Pontani, Lieberman & Pavane

(57) ABSTRACT

A non-pneumatic tire comprises circumferentially-spaced support elements joined together by an interconnection structure with the interposition of flexible joints, so as to ensure good overall operation.

27 Claims, 5 Drawing Sheets

FLEXIBLE NON-PNEUMATIC TIRE

BACKGROUND OF THE INVENTION

1. The Field of the Invention

The present invention relates to tires mounted on wheels and intended to be capable of bearing a substantial load without inflation pressure, referred to as non-pneumatic tires.

2. The Related Art

Patent application WO 00/37269, corresponding to U.S. patent application Ser. No. 09/466,524, filed Dec. 17, 1999, proposes such an elastic non-pneumatic tire. It describes a load-bearing structure essentially comprising a plurality of support elements arranged substantially radially, cyclically symmetrically all around the circumference of the tire. When the non-pneumatic tire described in patent application WO 00/37269 bears a load, a certain number of support elements present in the contact area are subjected to major flexing, which makes it possible for them to develop a force of taking up part of the load. An interconnection structure makes the support elements work together, transferring the stresses to the adjacent support elements. The ability of this tire to bear a certain load comes from the flexural stressing of the support elements present in the contact area of the elastic non-pneumatic tire, and it also comes from the like flexural stressing of the support elements outside the contact area of the elastic non-pneumatic tire, via the interconnection structure.

Finally, according to the teaching of the aforementioned patent application WO 00/37269, in the area of contact with the ground, there is a difference in flexion (radially) between adjacent support elements. It is also known that each of the support elements is capable of withstanding the torsion and that, before penetrating into the contact area, the support elements undergo a certain deradialisation. During travel in normal operation of the tire, the penetration of the support elements into the contact area is somewhat retarded, which causes gradual deradialisation. Then, as the support elements cross the contact area, they readopt a radial position and, upon emerging from the contact area, they undergo substantially symmetrical deradialisation of the first deradialisation, relative to the vertical plane passing through the axis of rotation of the tire.

As for the interconnection structure, while being capable of transmitting part of the stress on the support elements to the adjacent support elements, it is known that it is sufficiently flexible to permit displacements of the support elements relative to each other, not only in the radial direction but also in the circumferential direction. The difference in displacement of the support elements in the radial direction corresponds to a difference in bending stress thereof. The difference in displacement in the circumferential direction corresponds to a circumferential stress on the interconnection structure, as evidenced by the deradialisation.

Although the elastic non-pneumatic tire proposed proves perfectly capable of withstanding a large load during normal operation, the aim of the present invention is to improve the load-bearing structure proposed so as to impart thereto considerably improved endurance, while retaining its very great ability to support the load.

SUMMARY OF THE INVENTION

The invention proposes a flexible tire comprising a flexible load-bearing structure extending circumferentially about an axis of rotation, a tread on the radially outer periphery of the load-bearing structure, and at least one fastening zone, radially to the side of the axis of rotation, for immobilizing the load-bearing structure on a wheel disc, the load-bearing structure comprising:

a plurality of support elements extending essentially transversely, a first part of which is arranged at least facing the tread, and another part of which is arranged beyond the tread, the support elements being juxtaposed circumferentially and distributed around the full circumference of the load-bearing structure;

an interconnection structure, which provides an interconnection circumferentially between the support elements; and wherein a plurality of flexible joints, each arranged at least in part between the interconnection structure and the first part of each support element.

Preferably, the interconnection structure is arranged radially between the support elements and the tread. The support elements are preferably transversely continuous, from one axial side of the fastening zone to the other, passing opposite the tread. More preferably still, the interconnection structure is circumferentially continuous, and advantageously reinforced, for example, by cables or wires or strips as will become apparent hereafter.

The invention proposes producing flexible joints which are independent of each other and separated from each other circumferentially, each flexible joint being integral, on the one hand, with a support element and, on the other hand, with the interconnection structure, in order to transmit the forces between the support elements and the interconnection structure. The advantageous operation of the tire proposed by the invention makes it possible to obtain good overall operation of the load-bearing structure while suitably decoupling its constituent elements, which is a guarantee of excellent endurance combined with excellent performance.

BRIEF DESCRIPTION OF THE DRAWINGS

The invention is described in greater detail by reference to the following figures, in which.

DESCRIPTION OF EXEMPLARY EMBODIMENTS

Figure 1:
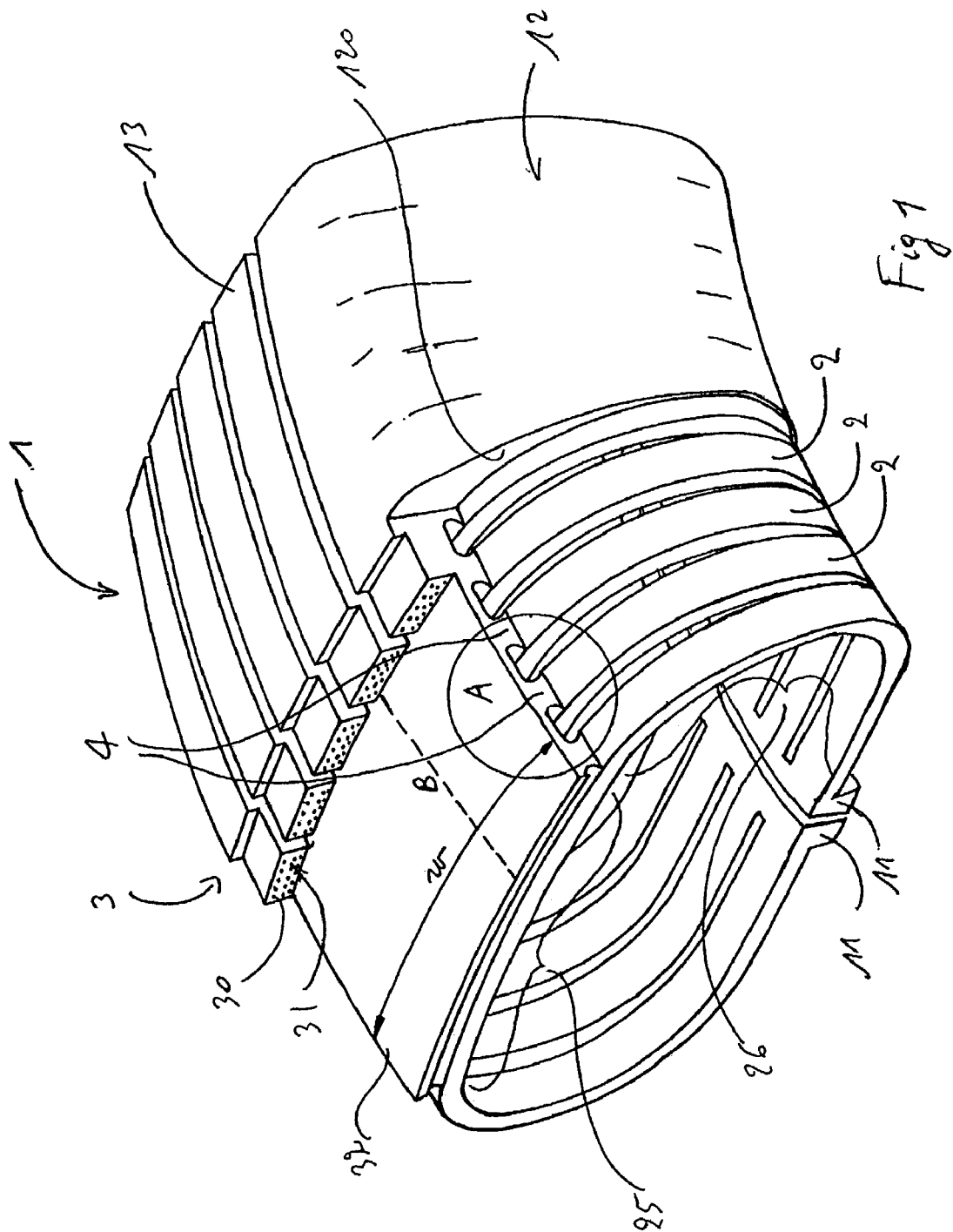
FIG. 1 is a partial perspective view of an embodiment a non-pneumatic tire according to the invention, with a cutaway showing the internal elements.
Figure 2:
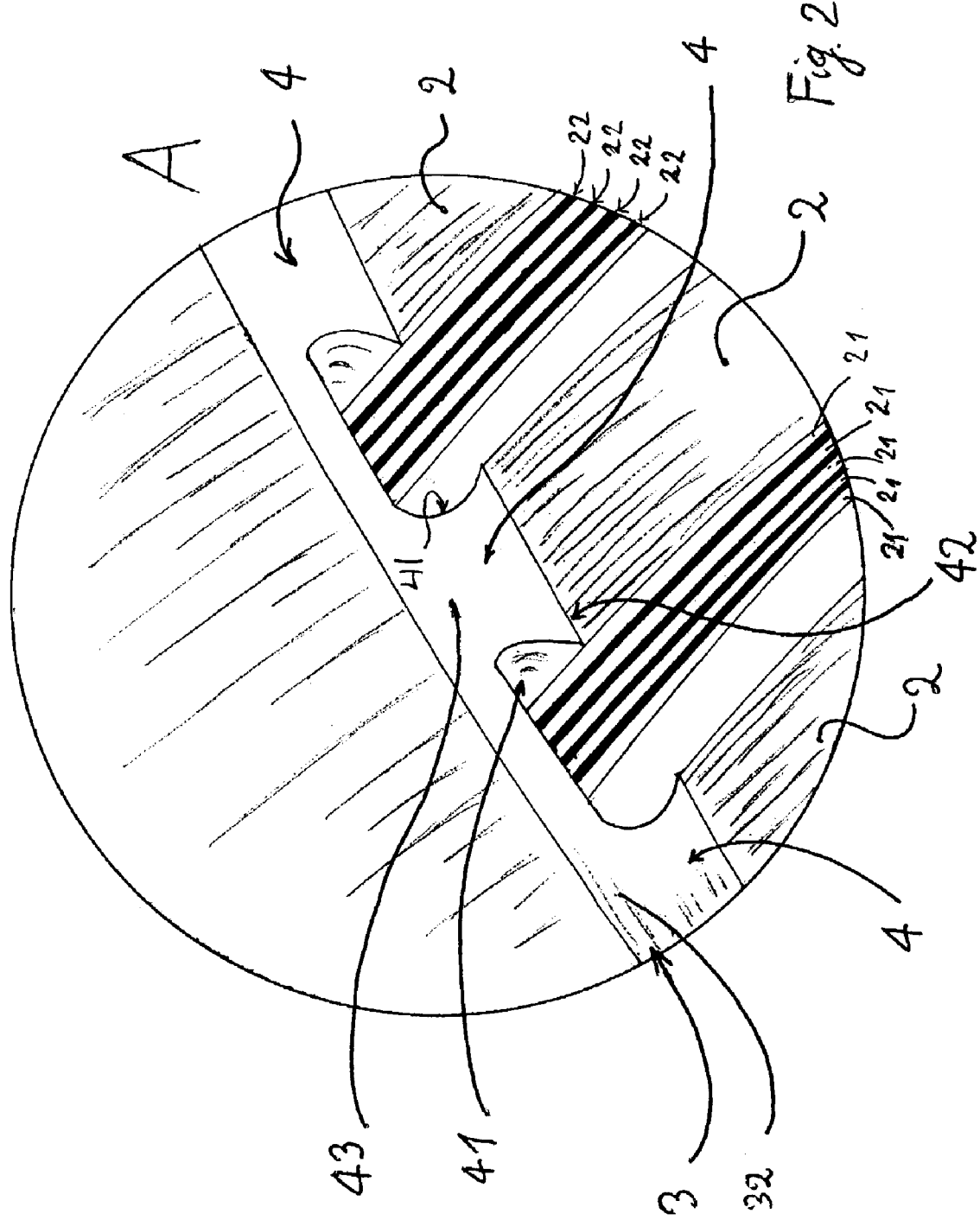
FIG. 2 is an enlarged detail view of the zone identified by the letter A in FIG. 1.

FIG. 1 illustrates an embodiment in which the profile of the tire defines a toric inner cavity of ovoid section. The non-pneumatic tire 1 comprises two axially separable fastening zones 11, two sidewalls 12 and a tread 13. The tread 13 is shown as comprising a plurality of parallel ribs; however this aspect is merely for illustrative purposes and is non-limitative. The sidewalls 12 are rounded and occupy the major part of the radial height of the tire 1. The load-bearing structure comprises support elements 2. The support elements 2 are circumferentially adjacent and each extends substantially radially and is continuous from one fastening zone 11 to the other. As can be seen in FIG. 2, each support element 2 comprised a stack of leaves 21 of composite material which are flexible and superposed with a layer of elastomer 22 interposed between the leaves 21. The bundle of leaves thus glued to one another forms a beam capable of being flexurally stressed. This aspect of the constitution of the laminate is, however, not limiting.

The load-bearing structure also comprises an interconnection structure 3 between the support elements 2, preferably arranged radially between the tread 13 and the support elements 2. The interconnection structure 3 is capable of distributing a radial stress circumferentially between a plurality of support elements 2, while permitting differences in displacement between adjacent support elements 2. To that end, the interconnection structure 3 preferably comprises a reinforcement oriented substantially circumferentially, for example a monofilament reinforcement 30 embedded in an elastomeric matrix 31, wound at several points to surround all of the support elements 2 opposite the tread 13, which itself is preferably made of rubber. The turns of monofilament reinforcement 30 are in this specific embodiment arranged radially above a layer 32 of an elastomeric material. The monofilament reinforcement 30 is wound substantially circumferentially, that is to say, at an angle close to 0° relative to a plane perpendicular to the axis. The monofilament reinforcement 30 may be wound according to the number of turns desired or, and this is equivalent, it may be monofilament rings of the desired number. Note that, in a variant of the monofilament reinforcement 30, a large number of cables could be used from among those commonly used as zero-degree reinforcements arranged within the tread of conventional pneumatic tires. It is also possible to use a reinforcement having the appearance of a leaf or a strip, for example of reinforced composite material, rather than a monofilament reinforcement. In this case, the leaf or strip is wound according to the number of turns desired or used in the form of rings used in the desired number.

For other details on the constitution of the support elements 2 and the interconnection structure 3, reference may be made to the aforementioned patent application WO 00/37269 and to its U.S. counterpart Ser. No. 09/466,524, the disclosure of which is incorporated here by reference for all purposes.

It should be recalled simply that the composite material of the leaves 21 and of the monofilament reinforcement 30 comprises reinforcement fibers embedded in a resin. A matrix of thermohardening resin is preferably used, but in some less stressing applications a thermoplastic resin might be suitable. The fibers are preferably arranged for the most part longitudinally in each leaf and in each monofilament reinforcement. For example, glass fibers are used. Of course, numerous other fibers could be used, such as, for example, carbon fibers. A hybrid prepared with fibers of different natures could also be used.

In particular, monofilament reinforcements such as described in U.S. patent application publication No. US 2002/0043319 can be used. The disclosure of the aforementioned U.S. application is hereby incorporated by reference for all purposes. This application proposes an elongate composite element, of very great length relative to its section, comprising substantially symmetrical technical fibers, such fibers being of great lengths, and being impregnated in a thermohardening resin having an initial modulus of extension of at least 2.3 GPa, in which the fibers are all substantially parallel to each other, the fiber content being between 30% and 80% of the overall mass of the elongate composite element, the density of the elongate composite element being less than 2.2, the elongate composite element having in flexion a breaking stress in compression greater than the breaking stress in extension, and the elongate composite element further having an elastic deformation in compression at least equal to 2%. For example, the substantially symmetrical technical fibers are glass fibers.

It can be seen that the support elements 2 and the interconnection structure 3 are connected by flexible joints 4. Each support element 2 is surmounted radially by one such flexible joint 4, which provides the mechanical connection between the support elements 2 and the interconnection structure 3, the forces transmitted from one to the other passing through the flexible joints 4. In a preferred embodiment of the invention, the support elements 2 are axially continuous opposite the tread and beyond, as far as the fastening zones 11. It can be seen that each support element 2 comprises a median part 25 corresponding substantially to the width of the interconnection structure 3. There is thus produced, in the non-limitative example illustrating the invention, a first part of each support element arranged at least opposite part of the tread 13. The interconnection structure 3 occupies substantially the entire width "w" of the tread 13. Each flexible joint 4 makes it possible to join the median part 25 of the support elements 2 to the interconnection structure 3. It can also be seen that each support element 2 comprises, on either side of the tire, a lateral part 26 extending into the sidewall 12 and joining the fastening zone 11. There is thus produced, in the non-limitative example illustrating the invention, a second or other part of each support element arranged axially beyond the tread, where the support elements 2 are flexed when the tire is loaded.

The flexible joint 4 proposed by the present invention could be applied in numerous other embodiments of non-pneumatic tires in which the load-bearing structure comprises support elements whose deflection under load provides the main part, if not all, of the load-bearing ability and an interconnection structure between support elements.

In the enlarged detail view of FIG. 2, there can be seen three flexible joints 4 arranged between the support elements 2 and the interconnection structure 3. Each flexible joint 4 has a sole 42 joined to a support element 2 and a head 43 integral with the interconnection structure 3. Between the sole 42 and the head 43, each flexible joint 4 has free transverse faces 41, i.e., transverse faces 41, that are clear of any contact with another part of the non-pneumatic tire 1. There is thus no element that would be opposed to the change of shape of the transverse faces 41 during operation of the tire (see the explanation of the operation of the tire set out below).

Each flexible joint 4 is preferably made of elastomeric material. Advantageously an elastomeric material of low hysteresis is used. By way of example, the use of sulphur-vulcanizable rubber mixes of the type used for the sidewalls of tires yields good results. Such mixes are of sufficiently low hysteresis and withstand tearing sufficiently well, which enables the flexible joints to function correctly in their role of transmitting the forces between the support elements 2 and the interconnection structure 3, while withstanding major, repeated deformations. Another material which yields excellent results is polyurethane.

Figure 3:
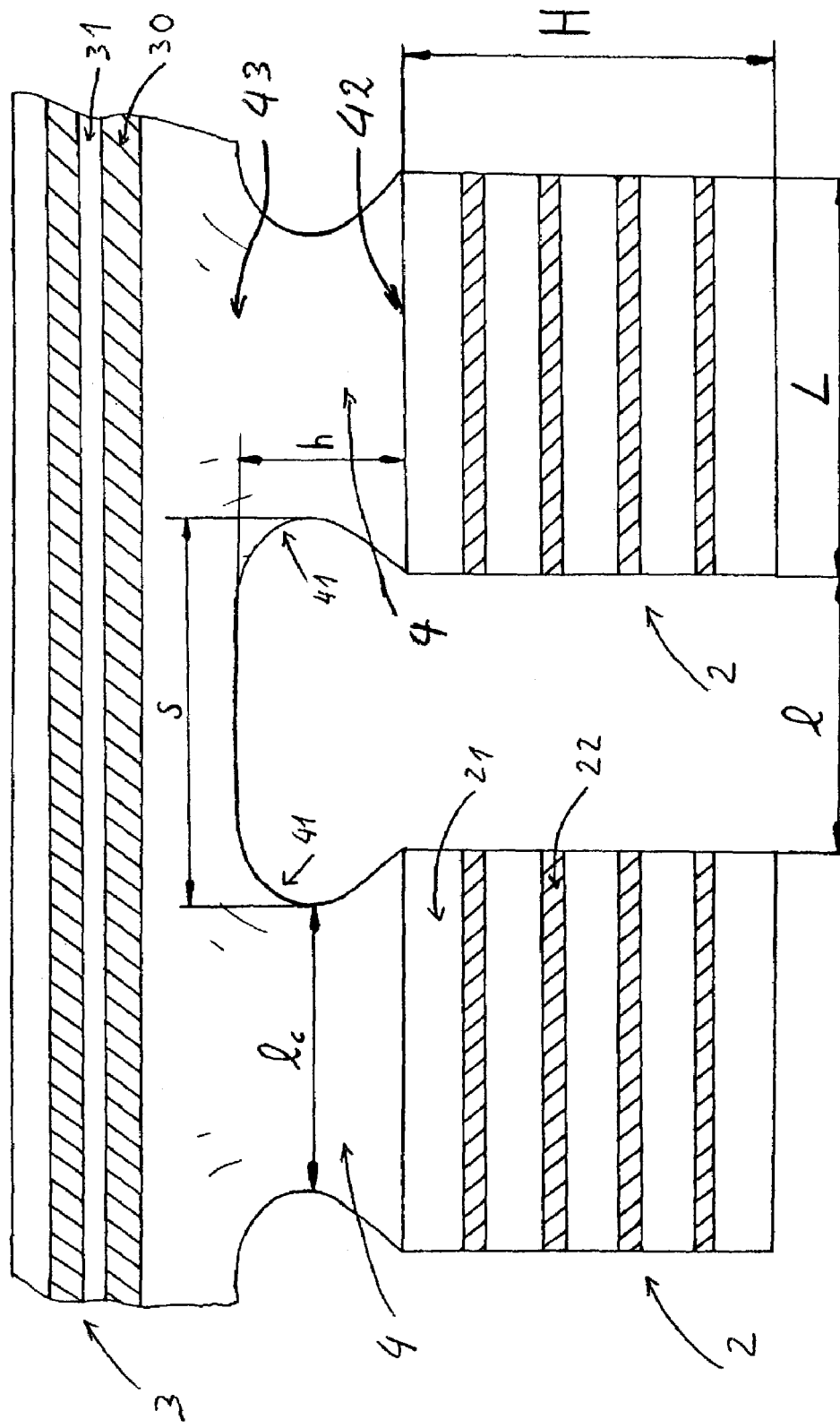
FIG. 3 is a partial section, through the plane perpendicular to the axis and passing through the trace B in FIG. 1.

In FIG. 3, it can be seen that each of the support elements 2 is of width "L" in the circumferential direction and of height "H" in the radial direction. It can be seen that the circumferential distance between two adjacent support elements is of length "l". As for the flexible joints 4, they are of radial height "h" and of circumferential width "s". It has already been seen that, in this embodiment of the invention, each flexible joint 4 is continuous substantially over the entire width "w" of the tread 13 (see FIG. 1). It can also be seen that each flexible joint 4 has substantially concave transverse faces 41, such that the width of the flexible joint 4 at the center of the radial thickness of the joint 4, referred to as the width "$l_c$", is somewhat less than the width "L" of the sole 42. There is, therefore, in the radial thickness of each flexible joint 4 an intermediate position between the sole 42 and the head 43, in which the width of the flexible joint is strictly less than the maximum width the joint 4 has in the region of the sole 42 or the head 43 thereof, preferably is less than 90% of the width "L", which in this example, is measured at the junction of the sole 42 with the support element 2.

By way of illustration, the size values below provide some reference points which have proved to permit very good operation of the structure proposed for an elastic non-pneumatic tire:

the maximum width of a flexible joint 4 is substantially equal to the width "L" of a support element 2;

the axial length of a flexible joint 4 is substantially equal to the width "w" of the tread 13;

the height "h" of a flexible joint 4 is less than the height "H" of a support element 2;

the height "h" of a flexible joint 4 is greater than half the height "H" of a support element 2; and the width "$l_c$" at the center of a flexible joint 4 is approximately 80% of the width "L" of the flexible joint 4.

Figure 7:
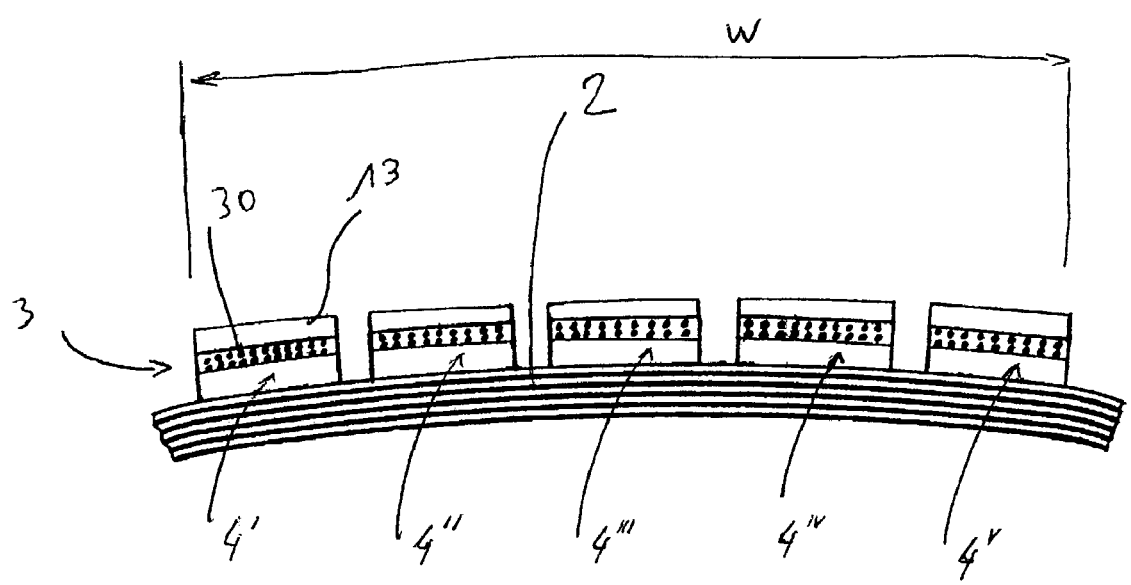
FIG. 7 shows a variant embodiment of the flexible joints.

In FIG. 7, there can be seen several sections $4^i$, $4^{ii}$, $4^{iii}$, $4^{iv}$, $4^v$ of a flexible joint 4 which are juxtaposed transversely, while leaving a small space between sections. The cumulative length of the sections $4^i$, $4^{ii}$, $4^{iii}$, $4^{iv}$, $4^v$ is less than the width "w" of the interconnection structure 3. Together, the sections $4^i$, $4^{ii}$, $4^{iii}$, $4^{iv}$, $4^v$ constitute a variant of a flexible joint linking the support element 2 to the interconnection structure 3. Another possible variant, which applies equally well if the joint is continuous transversely or is formed by several sections $4^i$, $4^{ii}$, $4^{iii}$, $4^{iv}$, $4^v$, is that the section of the joint through a plane perpendicular to the axis is variable when the section plane is displaced axially.

Of course, the width "L" of the support elements 2 fulfils in particular considerations of uniformity (the more there are, the greater the uniformity of the tire) and of convenience of manufacture (the more there are, the lower the torsional rigidity about the axis of the tire will be). By way of further illustration, some reference points are given below:

the height "H" of a support element 2 is of the same order of magnitude as its width "L";

the width "L" of the support elements 2 may vary typically between 5 and 15 mm for an elastic non-pneumatic tire sized for a rated load of the order of 500 kg or, in other words, for each range of load of 500 kg;

the space "s" between two adjacent support elements, measured in the part shown in FIG. 3, varies correlatively typically between 4 and 8 mm.

With reference again to the fastening zones 11 shown in FIG. 1, the designation "fastening zone" is used to designate generally that part of the tire intended to cooperate with a rigid mechanical part which is mechanically integral with a hub. Preferably, the fastening zone 11 is embedded or clamped in such mechanical part. In this case too, for other details on the fastening zone, on the connection of the tire to a hub, for example relating to the possibility of using a single monobloc fastening zone and on the advantage of modifying the width of the radially inner surface of the tire bearing on a rigid mechanical part, reference is made to the aforementioned patent application WO 00/37269 and U.S. patent application Ser. No. 09/466,524. It should be emphasized, inter alia, that, as explained in the aforementioned patent application, the fastening zone could equally well be a single, monobloc one, the radial section of the tire then being closed, the selection of one or the other arrangement in any case not being specific to the present invention. As far as for example the mounting of the axially separable fastening zones 11 is concerned, there can be seen in FIGS. 8 and 9 of patent application WO 00/37269 and U.S. patent application Ser. No. 09/466,524 a sort of very narrow rim formed by two inner ferrules 380 and 381 and an insert 321 part of which forms an outer ferrule, which makes it possible to grip each of the fastening zones in order to achieve embedding or clamping of the radially inner part of the load-bearing structure.

The operation of the elastic non-pneumatic tire when travelling under load will now be discussed in greater detail.

It should first of all be recalled that the tire illustrating the invention comprises laminated elements arranged substantially radially. In the image of what is known of the operation of a conventional radial tire, note that the laminated elements become "deradialised" somewhat upon passage into the contact area which, in addition to the flexion, also torsionally stresses them. "Deradialisation" refers to the fact that reinforcements which are normally oriented radially in the sidewalls (the carcass cords for a conventional radial tire, and the support elements 2 for the embodiments of the tire described here) deviate somewhat from the radial orientation, the maximum of such deviation being observed for the reinforcements opposite the entry into and exit from the area of contact with the ground. Note that this deradialisation is possible due to the ability of the support elements to accommodate deformations other than simple flexion in a radial plane.

The load-bearing structure, by deforming, permits a certain flattening of the zone of the tread in question by the contact with the ground, such that the imprint of the loaded tire on the ground has a certain surface, after the fashion of the well-known operation of inflated tires.

It should be recalled that the radially inner part of the load-bearing structure closest to the axis of rotation makes a major contribution to the deflection under load, and hence to the comfort provided by the tire. Consequently, the fastening zone(s) 11 should be located preferably over a fraction corresponding to at most 50% of the distance axially between the lateral limits of the tire. The radially inner part of the flexible load-bearing structure is thus in a fairly pronounced overhang beyond the fastening zone(s) 11. One beneficial design arrangement is that the support elements 2, just beyond the fastening zone, are oriented in a direction substantially parallel to the axis of rotation. This is what is shown in the example described. It should be noted finally, the tire described being symmetrical, that the fastening zone is substantially centered between the axial limits of the tire, without this being limitative. Of course, an asymmetrical architecture could be adopted, in particular in the location of the fastening zone.

Figure 4:
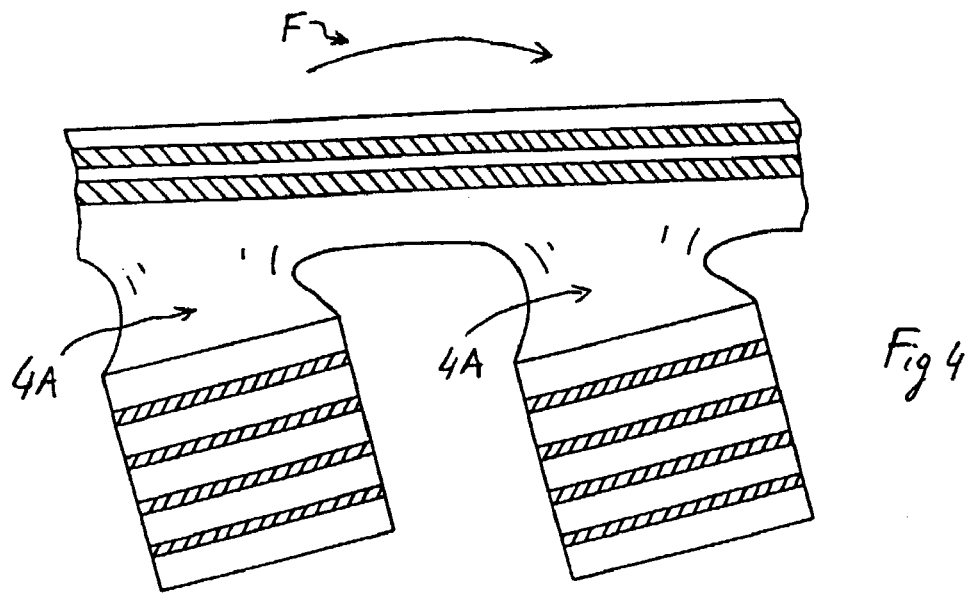
FIGS. 4 to 6 illustrate the deformation of the flexible joints when they pass into the contact area.
Figure 5:
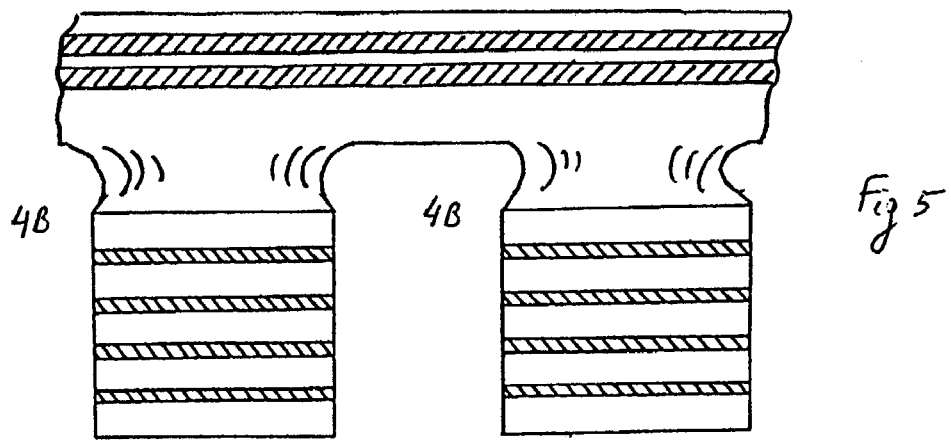
Figure 6:
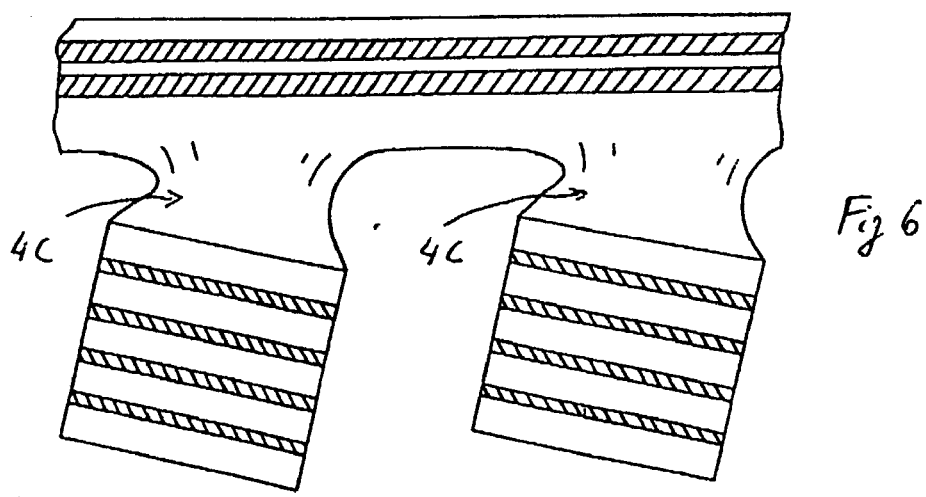

FIGS. 4 to 6 illustrate that part of the elastic tire corresponding to the contact area in operation under a rated load and show the deformation of the flexible joints 4 resulting from the deformation of the support elements 2 and of the interconnection structure 3. According to the direction of rotation of the tire, the deformation of the flexible joints 4 at the entrance to the contact area (FIG. 4) can be seen by observing the flexible joint n. There can also be seen the deformation of the flexible joints at the center of the contact area (FIG. 5), where the radial flexion of the support elements 2 is at a maximum, by observing the flexible joint 4B. Finally, at the exit from the contact area (FIG. 6) there can be seen the deformation of the flexible joint 4C, which is symmetrical to that of the flexible joint 4A.

It can be seen that the support elements 2 are not only flexed, but also tilt relative to the average orientation of the interconnection structure 3. The presence of the flexible joints 4 produces a connection of the support elements 2 with the interconnection structure 3 which permits the transfer of the mechanical operating stresses while permitting sufficient displacements, in particular twisting of the support elements, in order to provide the entire load-bearing structure with very great endurance. The support elements 2 are thus linked to the interconnection structure 3 with a sort of joint, rather like the way in which suspension arm elements are linked to the bodies of vehicles most frequently by flexible rubber joints.

The existence of a driving torque or a braking torque or of a camber or drift angle will of course superpose other deformations on those explained above.

It should be emphasized that although it has been the load-bearing structure which has been described above, it is not ruled out that the tire may comprise an outer skin 120 which gives it a uniform appearance, as can be seen in the right-hand part of FIG. 1. This skin 120 covers all of the support elements 2 from the outside thereof. There could also be a material between the support elements 2 which partially or completely fills the space between two adjacent support elements 2. Another advantage of the skin 120 is the imperviousness which it provides for the inner cavity defined by the load-bearing structure, thus preventing the inner cavity from being fouled by the penetration of stones, water or mud, which could disturb the operation of the tire or even damage it. However, such a skin is not designed to transmit forces either between the support elements or between the support elements and interconnection structure.

It should also be emphasized that it may be advantageous, for reasons of saving in the material used, for the tire not to comprise a skin covering the support elements 2 in the sidewalls; that is to say, for the support elements 2 to remain bare at least in the sidewalls, the sidewall of the final object then having the appearance of the left-hand part of FIG. 1. This part of FIG. 1 may therefore represent the true appearance of the sidewall, and not merely be a cutaway. Similarly, the tread could exhibit communications with the inner cavity, that is to say, not be airtight.

In another design variant (not shown), the interconnection structure 3 could be installed radially to the inside of the support elements 2 at least in part, with the interposition of flexible joints 4, and a wearing part (the tread), whether or not circumferentially continuous, could be arranged radially to the outside of the support elements 2.

The structure of the tire proposed makes it possible to construct tires designed to operate without inflation pressure (non-pneumatic tires). It should be noted, and this is an important comment, that there is nothing to prevent having a certain air pressure in the proposed tire. It is of course sufficient to ensure that the tire is airtight (presence of a skin 120 and non-perforated tread), or is provided with an inner tube. The characteristics, in particular flexibility, can then be adjusted by adjusting a certain level of pressurization "p" of the inner cavity. Making an analogy with an inflated pneumatic tire, the pressurization "p" mentioned here for the non-pneumatic tire according to the invention is compared with the variation in pressure "Δp" about a rated pressure "P" for which the tire which is to be inflated is designed. Thus, for clarification, when, depending on its destinations, a conventional pneumatic tire is used at levels of pressure of from "P" to "P+Δp", the tire according to the invention will be used, depending on its destinations, at "levels" of pressure of from 0 (that is to say, no pressure) to "Δp."

In summary, and to state what is most important, the support elements 2 bear the load; they do not work completely in isolation from each other, but are joined together by an interconnection structure 3 with the interposition of flexible joints 4, so as to ensure good overall operation, avoiding excessively intense shearing between two adjacent laminated elements 2, and so as to provide good uniformity, that is to say relative constancy of the properties whatever the circumferential position of the tire relative to the ground.

Although the invention has been described herein by reference to specific embodiments thereof, it will be understood that all such embodiments are susceptible of modification and variation without departing from the inventive concepts disclosed. All such modifications and variations, therefore, are intended to be included within the spirit and scope of the appended claims.

What is claimed is:

1. A flexible non-pneumatic tire having a flexible load-bearing structure extending circumferentially around an axis of rotation, a tread on a radially outer periphery of the load-bearing structure, and at least one fastening zone on a radially inner periphery of the load bearing structure, for immobilizing said load-bearing structure on a wheel disc, wherein the load-bearing structure comprises:
    a plurality of support elements, each of said support elements having a flexing part with at least one of its opposed ends extending transversely beyond the tread and a central portion facing the tread, said support elements being juxtaposed to each other circumferentially and distributed around the circumference of the load-bearing structure;
    an interconnection structure circumferentially interconnecting at least some of said support elements to each other; and
    a plurality of flexible joints interposed radially between said support elements and said interconnection structure, at least a part of each of said flexible joints being arranged between said interconnection structure and said flexing part of each of said support elements.

2. The tire according to claim 1, wherein the interconnection structure is arranged on a radially outer periphery of the plurality of support elements, over the support elements and beneath the tread.

3. The tire according to claim 1, wherein each of said flexible joints is composed of elastomeric material.

4. The tire according to claim 1, wherein each of said flexible joints is made of a sulphur-vulcanizable rubber mix.

5. The tire according to claim 1, wherein each of said flexible joints is composed of polyurethane.

6. The tire according to claim 1, wherein each of said flexible joints comprises a plurality of sections juxtaposed transversely.

7. The tire according to claim 1, wherein a circumferential width of each of said support elements is in a range of between 5 and 15 mm for an elastic non-pneumatic tire sized for a rated load of 500 kg.

8. The tire according to claim 1, wherein said support elements are axially continuous in said central portion facing the tread.

9. The tire according to claim 1, wherein each of said support elements comprises a stack of leaves of composite material with a layer of elastomer interposed between each adjacent pair of said leaves.

10. The tire according to claim 9, wherein the leaves comprise a matrix of thermohardening or thermoplastic resin, reinforced by fibers arranged substantially longitudinally in each one of said leaves.

11. The tire according to claim 1, wherein the load-bearing structure comprises two axially separable fastening zones.

12. The tire according to claim 11, wherein each one of said support elements is transversely continuous from one fastening zone to the other.

13. The tire according to claim 1, wherein each one of said support elements is bare in the sidewalls.

14. The tire according to claim 1, wherein the support elements are arranged substantially radially.

15. The tire according to claim 1, wherein the interconnection structure is circumferentially continuous.

16. The tire according to claim 1, wherein the interconnection structure is reinforced.

17. The tire according to claim 16, wherein the interconnection structure comprises a reinforcement oriented substantially circumferentially.

18. The tire according to claim 1, wherein each of said flexible joints is continuous substantially over an entire width of the tread.

19. The tire according to claim 1, wherein each of said flexible joints has a sole integrally joined to one of said support elements, a head integral with the interconnection structure, and between the sole and the head each flexible joint has transverse faces clear of any contact with another part of the tire.

20. The tire according to claim 19, wherein an intermediate position is provided, in a radial thickness of each flexible joint, between the sole and the head, and a width of the flexible joint at said intermediate position is substantially less than a maximum width of the flexible joint at the sole or the head of said joint.

21. The tire according to claim 20, wherein the transverse faces of each of said flexible joints are substantially concave and are located at said intermediate position, so that the width of each of said flexible joints at a center of the radial thickness of each joint is less than a width of the sole.

22. The tire according to claim 20, wherein the width of each of said flexible joints at the intermediate position is less than 90% of the maximum width of the joint.

23. The tire according to claim 21, wherein the width at a center of each of said flexible joints is approximately 80% of the width of such flexible joint.

24. The tire according to claim 1, wherein a maximum width of each of said flexible joints is substantially equal to a width of a one of said support elements.

25. The tire according to claim 1, wherein a height of each of said flexible joints is less than a height of one of said support elements.

26. The tire according to claim 1, wherein a height of each of said flexible joints is greater than half a height of one of said support elements.

27. A flexible non-pneumatic tire having a flexible load-bearing structure extending circumferentially around an axis of rotation, a tread on a radially outer periphery of the load-bearing structure, and at least one fastening zone on a radially inner periphery of the load bearing structure, for immobilizing said load-bearing structure on a wheel disc, wherein the load-bearing structure comprises:

a plurality of support elements extending substantially transversely, a first part of each support element being arranged at least facing the tread and another part of each support element being arranged beyond the tread, said support elements being juxtaposed to each other circumferentially and distributed around the circumference of the load-bearing structure;

an interconnection structure, which provides an interconnection circumferentially between the support elements; and a plurality of flexible joints interposed radially between each of said support elements and said interconnection structure, each of said flexible joints being arranged at least in part between said interconnection structure and said first part of each of said support elements.

* * * * *